United States Patent

Ischenko et al.

[15] 3,636,301

[45] Jan. 18, 1972

[54] FLUX FOR WELDING LIGHT ALLOYS

[72] Inventors: Anatoly Yakovlevich Ischenko, ulitsa Sholom Aleikhema, 26/23, kv. 122; Anatoly Grigorievich Sinchuk, ulitsa Krasnoarmeiskaya, 51, kv. 37, both of Kiev, U.S.S.R.

[22] Filed: May 7, 1970

[21] Appl. No.: 35,568

[30] Foreign Application Priority Data

May 30, 1969 U.S.S.R..................................1335972

[52] U.S. Cl....................................219/137, 148/26, 219/73
[51] Int. Cl. .......................................B23k 25/00, B23k 35/36
[58] Field of Search..........................148/24, 26; 219/137, 73

[56] References Cited

UNITED STATES PATENTS

| | | | |
|---|---|---|---|
| 648,831 | 5/1900 | Bates | 148/26 |
| 1,968,984 | 8/1934 | Binder | 148/26 |
| 2,325,014 | 7/1943 | Prendergast | 148/26 X |
| 2,552,104 | 5/1951 | Miller et al. | 148/26 |
| 2,802,762 | 8/1957 | Stetson et al. | 148/26 |

FOREIGN PATENTS OR APPLICATIONS

| | | | |
|---|---|---|---|
| 231,816 | 5/1925 | Great Britain | 148/26 |
| 567,725 | 2/1945 | Great Britain | 148/26 |
| 747,813 | 4/1956 | Great Britain | 148/26 |

*Primary Examiner*—L. Dewayne Rutledge
*Assistant Examiner*—G. T. Ozaki
*Attorney*—Holman & Stern

[57] ABSTRACT

Fluxes for welding light alloys such as aluminium or aluminium-based alloys, composed essentially of the following substances by weight percentage:

sodium chloride, 30–35 percent;

sodium fluoride, 28–30 percent;

potassium chloride, 15–20 percent; and lithium fluoride, 20–22 percent.

The flux is mostly applicable in machine building for electroslag welding of heavy objects made of light aluminium-based alloys.

2 Claims, No Drawings

FLUX FOR WELDING LIGHT ALLOYS

The present invention relates to fluxes for welding light alloys including those based on aluminum, in heavy items used in machine building.

Classified as light alloys are aluminum- and magnesium-base alloys.

Known heretofore is a flux for welding aluminum-based alloys, its weight percent composition being as follows:
  potassium chloride 30–60,
  lithium chloride 10–40,
  barium chloride 0–30,
  lithium fluoride 2–10 and
  aluminum fluoride 1.5–6.0
(cf. Author's Certificate of the U.S.S.R. No. 186843).

Said flux, however, is rather costly and proves to be practically water-insoluble which hampers its removal from the weld seam surface.

There is known another flux for welding aluminium-based alloys, its weight percent composition being as follows:
  potassium fluoride 10–40,
  sodium fluoride 30–60 and
  lithium fluoride 20–50
(cf. U.S.S.R. Author's Certificate No. 233422).

Yet such a flux possesses too high a degree of hygroscopicity.

It is an essential object of the present invention to eliminate the above-mentioned disadvantages.

It is a specific object of the present invention to provide a flux for welding light alloys, including aluminium-based ones, featuring such a composition that is of less density when molten than the metal being welded, is instrumental in obtaining a strong and staunch joint when being used in electroslag welding and is cheaper than the conventional fluxes of similar application.

Said object is accomplished by the provision of a flux for welding light aluminium-based alloys, comprising potassium chloride and lithium fluoride, of the following weight percent composition, according to the invention:
  sodium chloride 30–35,
  sodium fluoride 28–30,
  potassium chloride 15–20, and
  lithium fluoride 20–22.

Flux of such a composition features its smelting point and density lower than in aluminum, as well as an optimum electric conductivity and interfacial tension which ensure a stable proceeding of the electroslag welding process. Said flux is particularly expedient for use in welding aluminium-based alloys where it is conducive in obtaining high-quality welded joints.

For better understanding of the essence of the present invention, given below is an exemplary embodiment thereof.

To prepare the flux disclosed herein the components specified in the present invention are taken, then are dehydrated and weighed in the following weight percent ratio:
  sodium chloride 31,
  potassium chloride 19,
  lithium fluoride 20 and
  sodium fluoride 30.

Then the components are intermixed and subjected to melting. The melt having been cooled down, it is disintegrated until 1–5 mm. grains are obtained.

The thus-prepared flux has been used experimentally in electroslag welding of aluminum blocks of busways with 60×430 mm. cross section. The resultant welded joint featured a tight and staunch texture and the following mechanical properties:
  tensile strength 7.8–8.4 kg./mm.$^2$,
  weld seam safety factor over 0.95 and
  angle of bend of specimens 40×60 mm. in cross section—180°.

In another exemplary preparation of the flux according to the invention, its components have been taken in the following weight percent ratio:
  sodium chloride 30,
  potassium chloride 20,
  sodium fluoride 28 and
  lithium fluoride 22.

Similarly to the preceding example the stock components are dried, intermixed and melted, then the melt is cooled down and disintegrated into grains 1–5 mm. in size.

Electroslag welding with the use of the thus-obtained flux is effected by the conventional technique.

In the starting period of the welding process a rapid melting of the flux occurs with the result that an amount of heat is evolved sufficient to melt both the base metal and the electrode metal.

The presence of chlorides in the flux is conducive to a good wettability of the metal by the flux.

In the course of the welding process a complete separation of the molten metal bath and the slag bath occurs. The presence of the ions of fluorine imparts chemical activity to the flux with respect to oxide films on the surface of the metal being welded, with the result that such oxides are eliminated within the welding zone.

Moreover, slag inclusions are prevented from penetrating into the weld metal, a complete interfusion of the weld metal with the base metal is ensured, and the formation of the welded joint as a whole is improved.

The flux disclosed hereinabove was tested in electroslag welding of aluminum busways with flexible members such as a stack or pile with a 60×430 mm. cross section assembled from lamels 0.8–1 mm. thick each.

In another case a metal structure 50–250 mm. thick was welded in a single pass vertically at a rate of 5–6 m./hr.

In the above case the welded joint obtained featured its mechanical properties similar to those specified for the former example.

Furthermore, the residual flux left in the stack gaps caused no appreciable corrosion for a long period of time after welding.

The flux of the composition disclosed above is cheaper, low in hygroscopicity and is readily soluble in water, whereby it is easily removed from the weld seam surface after welding.

What is claimed is:

1. In a method of welding aluminium-based alloys, the improvement comprising using a flux consisting essentially of the following components (in weight percent):
  sodium chloride 30–35,
  sodium fluoride 28–30,
  potassium chloride 15–20, and
  lithium fluoride 20–22.

2. A flux for welding light alloys, consisting essentially of the following components (in weight percent):
  sodium chloride 30–55,
  sodium fluoride 28–30,
  potassium chloride 15–20 and
  lithium fluoride 20–22.

* * * * *